US012079700B2

United States Patent
Holtmann-Rice et al.

(10) Patent No.: US 12,079,700 B2
(45) Date of Patent: Sep. 3, 2024

(54) STRUCTURED ORTHOGONAL RANDOM FEATURES FOR KERNEL-BASED MACHINE LEARNING

(71) Applicant: GOOGLE LLC, Mountain View, CA (US)

(72) Inventors: Daniel Holtmann-Rice, New York, NY (US); Sanjiv Kumar, Jericho, NY (US); Xinnan Yu, Forest Hills, NY (US); Krzysztof Marcin Choromanski, New York, NY (US); Ananda Theertha Suresh, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 1475 days.

(21) Appl. No.: 15/793,455

(22) Filed: Oct. 25, 2017

(65) Prior Publication Data

US 2018/0114145 A1 Apr. 26, 2018

Related U.S. Application Data

(60) Provisional application No. 62/413,011, filed on Oct. 26, 2016.

(51) Int. Cl.
*G06N 20/10* (2019.01)
*G06F 17/14* (2006.01)
(Continued)

(52) U.S. Cl.
CPC ............ *G06N 20/10* (2019.01); *G06F 17/14* (2013.01); *G06F 17/16* (2013.01); *G06F 17/175* (2013.01); *G06F 18/00* (2023.01); *G06N 20/00* (2019.01)

(58) Field of Classification Search
CPC ........ G06N 20/00; G06N 20/10; G06F 17/14; G06F 17/16; G06F 17/175; G06K 9/00
See application file for complete search history.

(56) References Cited

U.S. PATENT DOCUMENTS 9,606,934 B2   3/2017  Acar et al.
2002/0146160 A1  10/2002  Parker et al.
(Continued)

FOREIGN PATENT DOCUMENTS

CN   105022740 A   11/2015
CN   105117708 A   12/2015
(Continued)

OTHER PUBLICATIONS

Bendersky, Eli, Visualizing Matrix Multiplication as a Linear Combination, Apr. 12, 2015. (Year: 2015).*
(Continued)

*Primary Examiner* — Marshall L Werner
(74) *Attorney, Agent, or Firm* — Brake Hughes Bellermann LLP

(57) ABSTRACT

Techniques of generating input for a kernel-based machine learning system that uses a kernel to perform classification operations on data involve generating unbiased estimators for gaussian kernels according to a new framework called Structured Orthogonal Random Features (SORF). The unbiased estimator $K_{SORF}$ to the kernel involves a linear transformation matrix $W_{SORF}$ computed using products of a set of pairs of matrices, each pair including an orthogonal matrix and respective diagonal matrix whose elements are real numbers following a specified probability distribution. Typically, the orthogonal matrix is a Walsh-Hadamard matrix, the specified probability distribution is a Rademacher dis-
(Continued)

tribution, and there are at least two, usually three, pairs of matrices multiplied together to form the linear transformation matrix $W_{SORF}$.

20 Claims, 8 Drawing Sheets

(51) Int. Cl.
    *G06F 17/16*     (2006.01)
    *G06F 17/17*     (2006.01)
    *G06F 18/00*     (2023.01)
    *G06N 20/00*     (2019.01)

(56) References Cited

U.S. PATENT DOCUMENTS

| | | |
|---|---|---|
| 2003/0185436 A1 | 10/2003 | Smith |
| 2004/0015462 A1* | 1/2004 | Lienhart ............... G16B 40/20 706/45 |
| 2011/0040711 A1 | 2/2011 | Perronnin |
| 2012/0254077 A1 | 10/2012 | Porikli et al. |

FOREIGN PATENT DOCUMENTS

| | | |
|---|---|---|
| CN | 105843781 A | 8/2016 |
| JP | 2012216191 A | 11/2012 |
| WO | 2011159255 A2 | 12/2011 |

OTHER PUBLICATIONS

Fastfood—Approximating Kernel Expansions in Loglinear Time, Proceedings of the 30th International Conference on Machine Learning, Jun. 2013. (Year: 2013).*
Yu et al., Scalable Machine Learning for Visual Data, PhD Thesis, Aug. 21, 2015. (Year: 2015).*
Le et al., Fastfood—Approximating Kernel Expansions in Loglinear Time, Proceedings of the 30th International Conference on Machine Learning, Jun. 2013. (Year: 2013).*
Dasgupta et al., Fast Locality-Sensitive Hashing, 17th ACM SIGKDD Conference on Knowledge Discovery and Data Mining, Aug. 2011. (Year: 2011).*
Ailon et al., Fast Dimension Reduction Using Rademacher Series on Dual BCH Codes, Discrete and Computational Geometry (2009) 42:615-630, 2009. (Year: 2009).*
Ailon et al., "Approximate Nearest Neighbors and the Fast Johnson-Lindenstrauss Transform", Proceedings of 38th Annual ACM Symposium on Theory of Computing, May 21-23, 2006, pp. 557-563.
Charikar, Moses S., "Similarity Estimation Techniques from Rounding Algorithms", Proceedings of 34th Annual ACM Symposium on Theory of Computing, May 19-21, 2002, pp. 380-388.
Choromanska et al., "Binary Embeddings with Structured Hashed Projections", arXiv:1511.05212, Nov. 16, 2015, 14 pages.
Cortes et al., "Support-Vector Networks", Machine Learning, vol. 20, Issue 3, Sep. 1995, pp. 273-297.
Fino et al., "Unified Matrix Treatment of the Fast Walsh-Hadamard Transform", IEEE Transactions on Computers, vol. C-25, Issue 11, Nov. 1976, pp. 1142-1146.
Hinrichs et al., "Johnson-Lindenstrauss Lemma for Circulant Matrices", available online at <http://users.minet.uni-ena.de/~hinrichs/paper/42/Hinrichs_Vybiral_cor.pdf>, Aug. 31, 2010, 7 pages.
Joachims, Thorsten, "Training Linear SVMS in Linear Time", Proceedings of 12th ACM SIGKDD International Conference on Knowledge Discovery and Data Mining, Aug. 20-23, 2006, pp. 217-226.
Kar et al., "Random Feature Maps for Dot Product Kernels", Proceedings of the 15th International Conference on Artificial Intelligence and Statistics, 2012, pp. 583-591.
Le et al., "Fastfood—Approximating Kernel Expansions in Loglinear Time", Proceedings of the 30th International Conference on Machine Learning, 2013, 9 pages.
Li et al., "Random Fourier Approximations for Skewed Multiplicative Histogram Kernels", Pattern Recognition, 2010, 10 pages.
Maji et al., "Max-Margin Additive Classifiers for Detection", IEEE 12th International Conference on Computer Vision, 2009, 8 pages.
Rahimi et al., "Random Features for Large-Scale Kernel Machines", Proceedings of 20th International Conference on Neural Information Processing Systems, Dec. 3-6, 2007, 8 pages.
Rudi et al., "Generalization Properties of Learning with Random Features", NIPS, May 21, 2016, pp. 1-38.
Shalev-Shwartz et al., "Pegasos: Primal Estimated Sub-Gradient Solver for SVM", Mathematical Programming, vol. 127, Issue 1, 2011, pp. 3-30.
Vempati et al., "Generalized RBF Feature Maps for Efficient Detection", Proceedings of BMVC, 2010, pp. 1-11.
Sriperumbudur et al., "Optimal Rates for Random Fourier Features", Proceedings of 28th International Conference on Neural Information Processing Systems—vol. 1, 2015, 9 pages.
Vedaldi et al., "Efficient Additive Kernels via Explicit Feature Maps", IEEE Transactions on Pattern Analysis And Machine Intelligence, vol. XX, No. XX, Jun. 2011, 14 pages.
Yang, Zichao, "Deep Fried Convnets", IEEE International Conference on Computer Vision (ICCV), 2015, pp. 1476-1483.
Yang et al., "Nystrom Method vs Random Fourier Features: A Theoretical and Empirical Comparison", Proceedings of the 25th International Conference on Neural Information Processing Systems—vol. 1, 2012, 9 pages.
Yang et al., "Quasi-Monte Carlo Feature Maps for Shift-Invariant Kernels", Proceedings of the 31st International Conference on Machine Learning, 2014, 9 pages.
Yi et al., "Binary Embedding: Fundamental Limits and Fast Algorithm", arXiv:1502.05746, Feb. 19, 2015, pp. 1-30.
Yu et al., "Circulant Binary Embedding", Proceedings of 31st International Conference on Machine Learning, 2014, 9 pages.
Yu et al., "Compact Nonlinear Maps and Circulant Extensions", arXiv:1503.03893, Mar. 12, 2015, 14 pages.
Zhang et al., "Fast Orthogonal Projection Based on Kronecker Product", IEEE International Conference on Computer Vision (ICCV), 2015, pp. 2929-2937.
International Search Report and Written Opinion for International Application No. PCT/US2017/058415, mailed on May 8, 2018, 13 pages.
Yu et al., "Orthogonal Random Features", 30th Conference on Neural Information Processing Systems (NIPS 2016), Dec. 5, 2016, pp. 1-20.
Notice of Allowance with English translation for Chinese Application No. 201780072443.3, mailed Oct. 17, 2023, 8 pages.

* cited by examiner

| Dataset | Method | $D = 2d$ | $D = 4d$ | $D = 6d$ | $D = 8d$ | $D = 10d$ | Exact |
|---|---|---|---|---|---|---|---|
| letter $d = 16$ | RFF | 76.44 ± 1.04 | 81.61 ± 0.46 | 85.46 ± 0.56 | 86.58 ± 0.99 | 87.84 ± 0.59 | 90.10 |
| | ORF | 77.49 ± 0.95 | 82.49 ± 1.16 | 85.41 ± 0.60 | 87.17 ± 0.40 | 87.73 ± 0.63 | |
| | SORF | 76.18 ± 1.20 | 81.63 ± 0.77 | 84.43 ± 0.92 | 85.71 ± 0.52 | 86.78 ± 0.53 | |
| forest $d = 64$ | RFF | 77.61 ± 0.23 | 78.92 ± 0.30 | 79.29 ± 0.24 | 79.57 ± 0.21 | 79.85 ± 0.10 | 80.43 |
| | ORF | 77.88 ± 0.24 | 78.71 ± 0.19 | 79.38 ± 0.19 | 79.63 ± 0.21 | 79.54 ± 0.15 | |
| | SORF | 77.64 ± 0.20 | 78.88 ± 0.14 | 79.31 ± 0.12 | 79.50 ± 0.14 | 79.56 ± 0.09 | |
| usps $d = 256$ | RFF | 94.27 ± 0.38 | 94.98 ± 0.10 | 95.43 ± 0.22 | 95.66 ± 0.25 | 95.71 ± 0.18 | 95.57 |
| | ORF | 94.21 ± 0.51 | 95.26 ± 0.25 | 96.46 ± 0.18 | 95.52 ± 0.20 | 95.76 ± 0.17 | |
| | SORF | 94.45 ± 0.39 | 95.20 ± 0.43 | 95.51 ± 0.34 | 95.46 ± 0.34 | 95.67 ± 0.15 | |
| cifar $d = 512$ | RFF | 73.19 ± 0.23 | 75.06 ± 0.33 | 75.85 ± 0.30 | 76.28 ± 0.30 | 76.54 ± 0.31 | 78.71 |
| | ORF | 73.59 ± 0.44 | 75.06 ± 0.28 | 76.00 ± 0.26 | 76.29 ± 0.26 | 76.69 ± 0.09 | |
| | SORF | 73.54 ± 0.26 | 75.11 ± 0.21 | 75.76 ± 0.21 | 76.48 ± 0.24 | 76.47 ± 0.28 | |
| mnist $d = 1024$ | RFF | 94.83 ± 0.13 | 95.48 ± 0.10 | 95.85 ± 0.07 | 96.02 ± 0.06 | 95.98 ± 0.05 | 97.14 |
| | ORF | 94.95 ± 0.25 | 95.64 ± 0.06 | 95.85 ± 0.09 | 95.95 ± 0.08 | 96.06 ± 0.07 | |
| | SORF | 94.98 ± 0.18 | 95.48 ± 0.08 | 95.77 ± 0.09 | 95.98 ± 0.05 | 96.02 ± 0.07 | |
| gisette $d = 4096$ | RFF | 97.68 ± 0.28 | 97.74 ± 0.11 | 97.66 ± 0.25 | 97.70 ± 0.16 | 97.74 ± 0.05 | 97.60 |
| | ORF | 97.56 ± 0.17 | 97.72 ± 0.15 | 97.80 ± 0.07 | 97.64 ± 0.09 | 97.68 ± 0.04 | |
| | SORF | 97.64 ± 0.17 | 97.62 ± 0.04 | 97.64 ± 0.11 | 97.68 ± 0.08 | 97.70 ± 0.14 | |

FIG. 4

STRUCTURED ORTHOGONAL RANDOM FEATURES FOR KERNEL-BASED MACHINE LEARNING

CROSS-REFERENCE TO RELATED APPLICATION

This application claims the benefit of U.S. Provisional Application No. 62/413,011, filed on Oct. 26, 2016, the disclosure of which is incorporated by reference herein in its entirety.

BACKGROUND

Many systems use large-scale machine learning to accomplish challenging problems such as speech recognition, computer vision, image and sound file searching and categorization, etc. Deep learning of multi-layer neural networks is an effective large-scale approach. Kernel methods, e.g., Gaussian and polynomial kernels, have also been used on smaller-scale problems, but scaling kernel methods has proven challenging.

SUMMARY

Implementations provide a kernel approximation method that is compact, fast, and accurate for gaussian kernels. The implementations generate unbiased estimators for gaussian kernels according to a new framework called Structured Orthogonal Random Features (SORF). The unbiased estimator $K_{SORF}$ to the kernel involves a linear transformation matrix $W_{SORF}$ computed using products of a set of pairs of matrices, each pair including an orthogonal matrix and respective diagonal matrix whose elements are real numbers following a specified probability distribution. Typically, the orthogonal matrix is a Walsh-Hadamard matrix, the specified probability distribution is a Rademacher distribution, and there are at least two, usually three, pairs of matrices multiplied together to form the linear transformation matrix $W_{SORF}$.

According to one aspect, a method of generating input for a kernel-based machine learning system that uses a kernel to perform classification operations on data can include generating, by processing circuitry of the kernel-based machine learning system, a set of diagonal matrices, each of the set of diagonal matrices having non-diagonal elements that are zero and diagonal elements that have values distributed according to a specified probability distribution function. The method can also include producing, by the processing circuitry, a set of orthogonal matrices, each of the set of orthogonal matrices having mutually orthogonal rows. The method can further include, for each of the set of diagonal matrices, forming, by the processing circuitry, a set of matrix pairs, each of the set of matrix pairs including (i) that diagonal matrix, and (ii) a respective orthogonal matrix of the set of orthogonal matrices. The method can further include generating, by the processing circuitry, a product of each of the set of matrix pairs to produce a linear transformation matrix, the linear transformation matrix being an unbiased estimator of the kernel used by the kernel-based machine learning system.

The details of one or more implementations are set forth in the accompanying drawings and the description below. Other features will be apparent from the description and drawings, and from the claims.

BRIEF DESCRIPTION OF DRAWINGS

FIG. 4 is a table of various approximations to various example kernels, which show additional benefits of the disclosed subject matter.

Like reference symbols in the various drawings indicate like elements.

DETAILED DESCRIPTION

Figure 1:
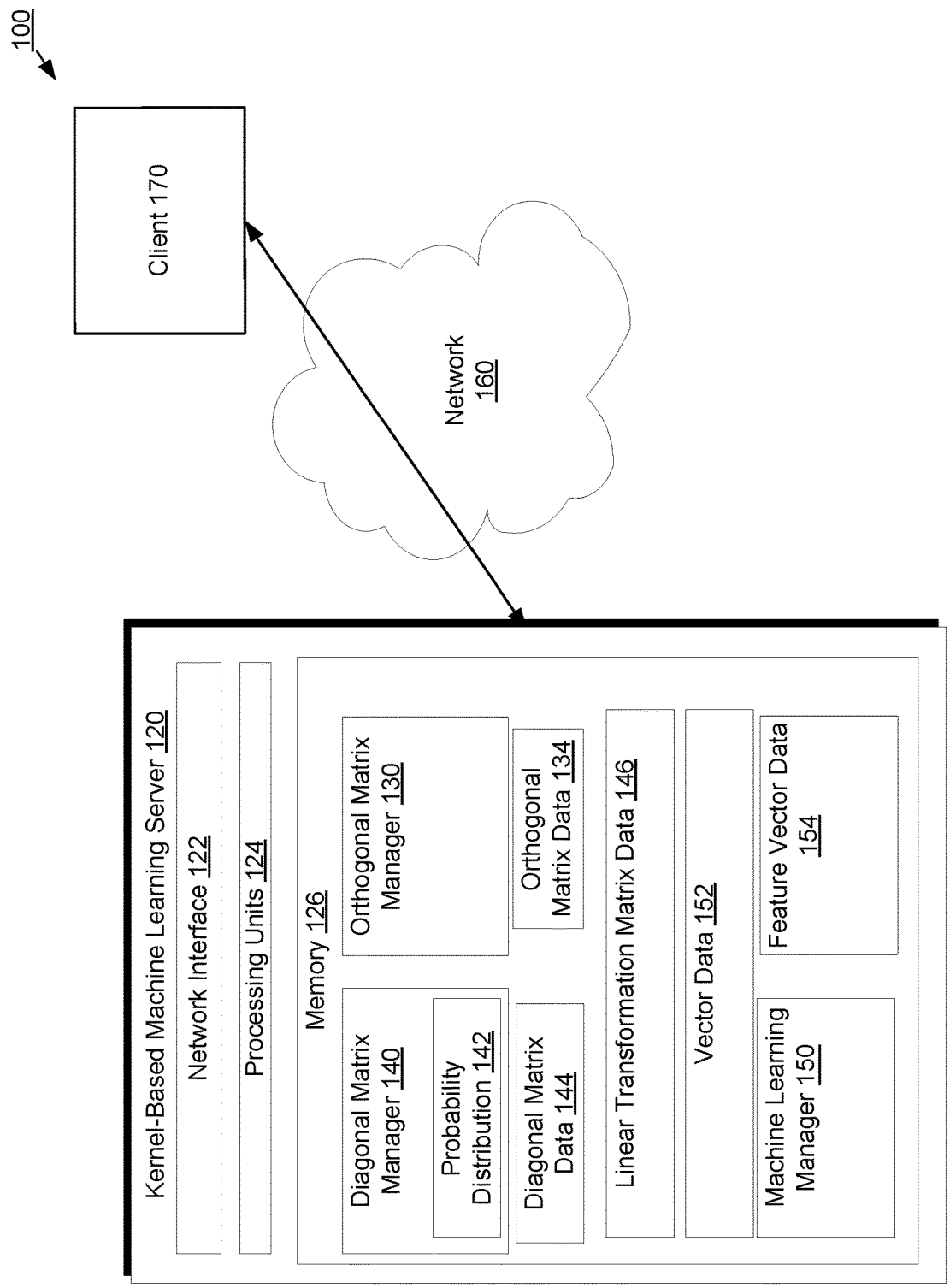
FIG. 1 illustrates an example electronic environment in accordance with the disclosed subject matter.

Kernel methods are used in nonlinear learning. A kernel represents a similarity function between two d-dimensional data vectors. Kernels methods involve expressing a kernel $k(x,y)$ at a first data vector x and a second data vector y approximately as an inner product of a feature vector function of the first data vector $\phi(x)$ and the feature vector function of the second data vector $\phi(y)$. The feature vector function is typically a 2D-dimensional vector where 2D>d. According to the Random Fourier Features (RFF) approach to approximating a kernel, when the kernel is positive definite and shift-invariant, the feature vector function takes the form $$\phi(x)^T = \sqrt{\frac{1}{D}} [\sin w_1^T x, \sin w_2^T x, \ldots, \sin w_D^T x, \cos w_1^T x, \cos w_2^T x, \ldots, \cos w_D^T x],$$

where each of the vectors $w_j$, $j \in \{1, 2, \ldots, D\}$ is sampled i.i.d. from a probability distribution function p(w) defined as the Fourier transform of the kernel k(x−y), viz.

$$k(x-y) = \int_{\mathbb{R}^d} p(w) e^{iw^T(x-y)} dw.$$

Define $W = [w_1, w_2, \ldots, w_D]^T$. The resources required for the computation of the approximate kernel is dominated by the linear transformation Wx. The Gaussian kernel $k(x,y) = e^{-\|x-y\|^2/2\sigma^2}$ may therefore be approximated using the linear transformation matrix $$W_{RFF} = \frac{1}{\sigma} G,$$

where G is a d×d matrix with entries sampled from a normal distribution. (When D<d, the first D dimensions of the result are used; when D>d, multiple independently generated random features are used and the results are concatenated.)

The linear transformation matrix $W_{RFF}$ provides an unbiased estimator $K_{RFF}$ for the gaussian kernel.

Unfortunately, the RFF approach to approximating a kernel has some disadvantages. For example, the computation cost of the linear transformation matrix G in space and time is O(Dd), which is expensive for high-dimensional data. Further, the error in this approximation of the kernel, as expressed as the variance of the unbiased estimator $K_{RFF}$, is relatively large.

In contrast to the above-described RFF approach, improved techniques involve generating unbiased estimators for gaussian kernels according to a new framework called Structured Orthogonal Random Features (SORF). The unbiased estimator $K_{SORF}$ to the kernel involves a linear transformation matrix $W_{SORF}$ computed using products of a set of pairs of matrices, each pair including an orthogonal matrix and respective diagonal matrix whose elements are real numbers following a specified probability distribution. Typically, the orthogonal matrix is a Walsh-Hadamard matrix, the specified probability distribution is a Rademacher distribution, and there are at least two, usually three, pairs of matrices multiplied together to form the linear transformation matrix $W_{SORF}$.

Advantageously, the linear transformation matrix $W_{SORF}$ has a computational cost in space that is O(D) and in time that is O(D log D). Further, the variance of $K_{SORF}$ is significantly smaller than that of $K_{RFF}$.

FIG. 1 is a block diagram of a large-scale learning system in accordance with an example implementation. The system 100 may be used to generate a nonlinear map of input vectors that are more accurate and allow computationally efficient training and testing of a support vector machine (SVM) or other type of kernel-based machine-learning system. The vectors are an approximation of gaussian kernels, which might be used as input to various machine learning problems, such as a classification system, a clustering system, a regression system, etc. For example, a classification system may use the approximations to classify the data items using a linear classifier. The depiction of system 100 in FIG. 1 is described as a server-based classifier system. However, other configurations and applications may be used. For example, system 100 may be a clustering system, a regression system, an anomaly detection system, etc.

Figure 6:
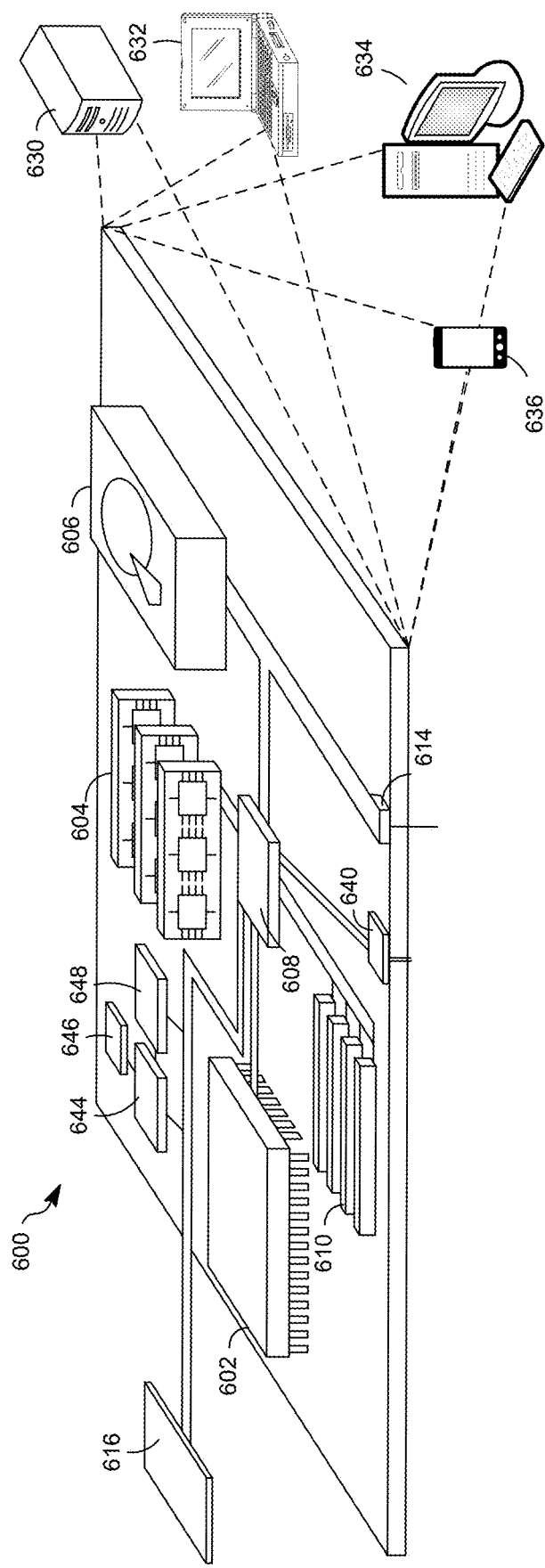
FIG. 6 shows an example of a computer device that can be used to implement the described techniques.
Figure 7:
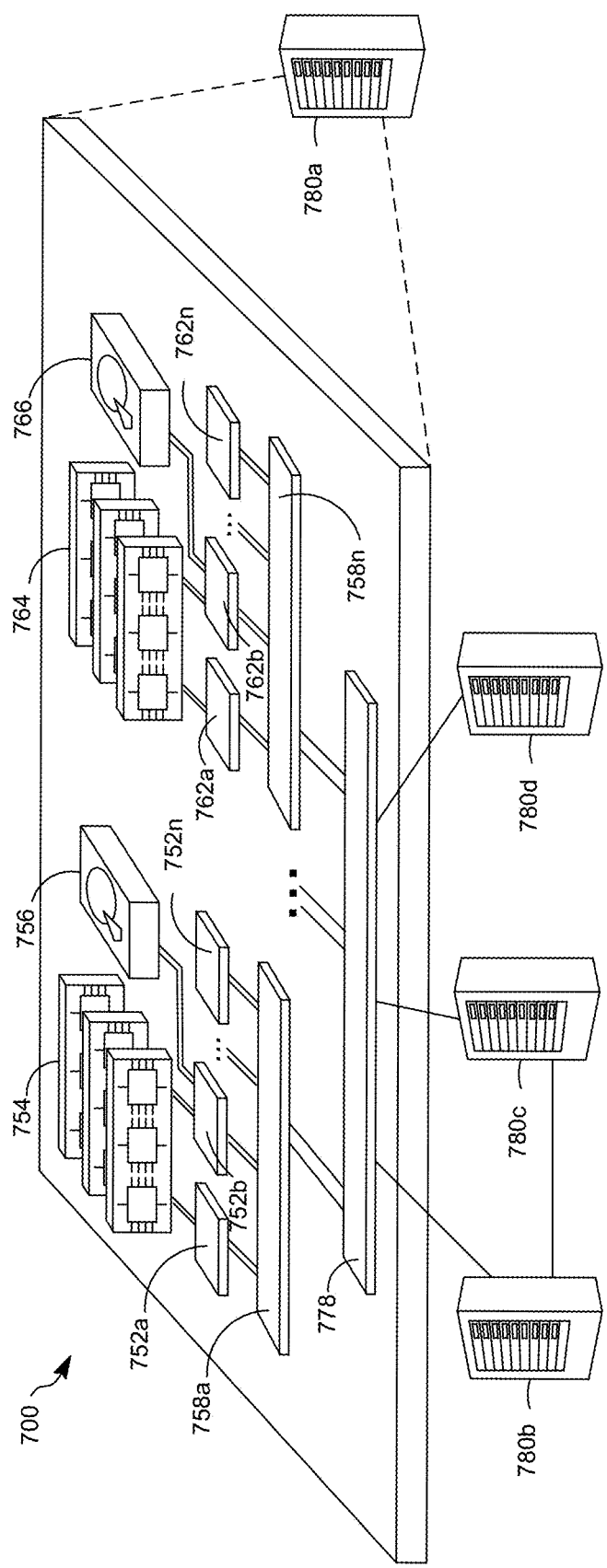
FIG. 7 shows an example of a distributed computer device that can be used to implement the described techniques.

The large-scale learning system 100 may be a computing device or devices that take the form of a number of different devices, for example a standard server, a group of such servers, or a rack server system, such as kernel-based machine learning server 120. In addition, system 100 may be implemented in a personal computer, for example a laptop computer. The kernel-based machine learning server 120 may be an example of computer device 600, as depicted in FIG. 6 or computer device 700, as depicted in FIG. 7.

The kernel-based machine learning server 120 includes a network interface 122, one or more processing units 124, and memory 126. The network interface 122 includes, for example, Ethernet adaptors, Token Ring adaptors, and the like, for converting electronic and/or optical signals received from the network 160 to electronic form for use by the kernel-based machine learning server 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the kernel-based machine learning server 120 can be, or can include processors (e.g., processing units 124) configured to process instructions stored in the memory 126. Examples of such instructions as depicted in FIG. 1 include orthogonal matrix manager 130, a diagonal matrix manager 140, and a machine learning manager 150. Further, as illustrated in FIG. 1, the memory 126 is configured to store various data, which is described with respect to the respective managers that use such data.

The kernel-based machine learning server 120 may use feature vectors extracted from data items and generate a randomized feature map that produces an approximation of the features, e.g., via a gaussian kernel. A feature vector may be thought of as an array of floating point numbers with a dimensionality of d, or in other words an array with d positions. The data items may be a database, for example of files or search items. For instance, the data items may be any kind of file, such as documents, images, sound files, video files, etc., and the feature vectors may be extracted from the file. The data items may also be database records and the features may be extracted from data related to an item in the database.

The orthogonal matrix manager 130 is configured to generate orthogonal matrix data 134. The orthogonal matrix data 134 includes numbers defining a matrix or matrices having rows that form an orthogonal basis. The size of an orthogonal matrix generated by the orthogonal matrix manager 130 is based on the dimensionality d. For example, in some implementations the orthogonal matrix manager 130 is configured to generate Walsh-Hadamard matrices. Such matrices are generated according to the following rule:

$$H_1 = \begin{pmatrix} 1 & 1 \\ 1 & -1 \end{pmatrix},$$

$$H_n = H_1 \otimes H_{n-1},$$

where $\otimes$ represents the Kronecker product. Accordingly, Walsh-Hadamard matrices are square matrices having a dimension that is a power of two. The orthogonal matrix manager 130 would then generate a Walsh-Hadamard matrix having a dimension that is the smallest power of two greater than d.

The diagonal matrix manager 140 is configured to generate diagonal matrix data 144. The diagonal matrix data 144 includes numbers defining matrices that have zeroes as off-diagonal elements. The values of the diagonal elements are defined via a specified probability distribution function 142. The dimension of the diagonal matrices is the same as the dimension of the orthogonal matrix of the orthogonal matrix data 134. In some implementations, the values of the diagonal elements are either −1 or 1, and the probability distribution 142 is a Rademacher distribution (i.e., coin-flipping distribution).

The kernel-based machine learning server 120 is configured to form linear transformation matrix data 146 from the orthogonal matrix data 134 and the diagonal matrix data 144. Along these lines, when the diagonal matrix data 144 includes numbers defining N diagonal matrices $D_1$, $D_2$, ..., $D_N$, then the linear transformation matrix $W_{SORF}$ defining the linear transformation matrix data 146 is equal to $$W_{SORF} = \frac{\sqrt{d}}{\sigma} H_n D_1 H_n D_2 \dots H_n D_N,$$

where n is the exponent of the least power of two greater than d, and σ is the width of the gaussian kernel. In some implementations, N is at least 2; in a typical implementation, N is equal to 3.

The system 100 may use the machine learning manager 150 to perform image searches, speech recognition, etc., on vector data 152. The system 100 may use conventional methods to extract the vectors from the vector data 152 or may be provided to extracted feature vector data 154. As some examples, the extracted feature vector data 154 may be pixels from an image file in the data items or speech waveforms.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the kernel-based machine learning server 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the kernel-based machine learning server 120.

The components (e.g., modules, processing units 124) of the kernel-based machine learning server 120 can be configured to operate based on one or more platforms (e.g., one or more similar or different platforms) that can include one or more types of hardware, software, firmware, operating systems, runtime libraries, and/or so forth. In some implementations, the components of the kernel-based machine learning server 120 can be configured to operate within a cluster of devices (e.g., a server farm). In such an implementation, the functionality and processing of the components of the kernel-based machine learning server 120 can be distributed to several devices of the cluster of devices.

The components of the kernel-based machine learning server 120 can be, or can include, any type of hardware and/or software configured to process attributes. In some implementations, one or more portions of the components shown in the components of the kernel-based machine learning server 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the kernel-based machine learning server 120 can be, or can include, a software module configured for execution by at least one processor (not shown). In some implementations, the functionality of the components can be included in different modules and/or different components than those shown in FIG. 1.

Although not shown, in some implementations, the components of the kernel-based machine learning server 120 (or portions thereof) can be configured to operate within, for example, a data center (e.g., a cloud computing environment), a computer system, one or more server/host devices, and/or so forth. In some implementations, the components of the kernel-based machine learning server 120 (or portions thereof) can be configured to operate within a network. Thus, the components of the kernel-based machine learning server 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer kernel-based machine learning server 120 can be, or can include, processors configured to process instructions stored in a memory. For example, the orthogonal matrix manager 130 (and/or a portion thereof), the diagonal matrix manager 140 (and/or a portion thereof), and the machine learning manager 150 (and/or a portion thereof) can be a combination of a processor and a memory configured to execute instructions related to a process to implement one or more functions.

Figure 2:
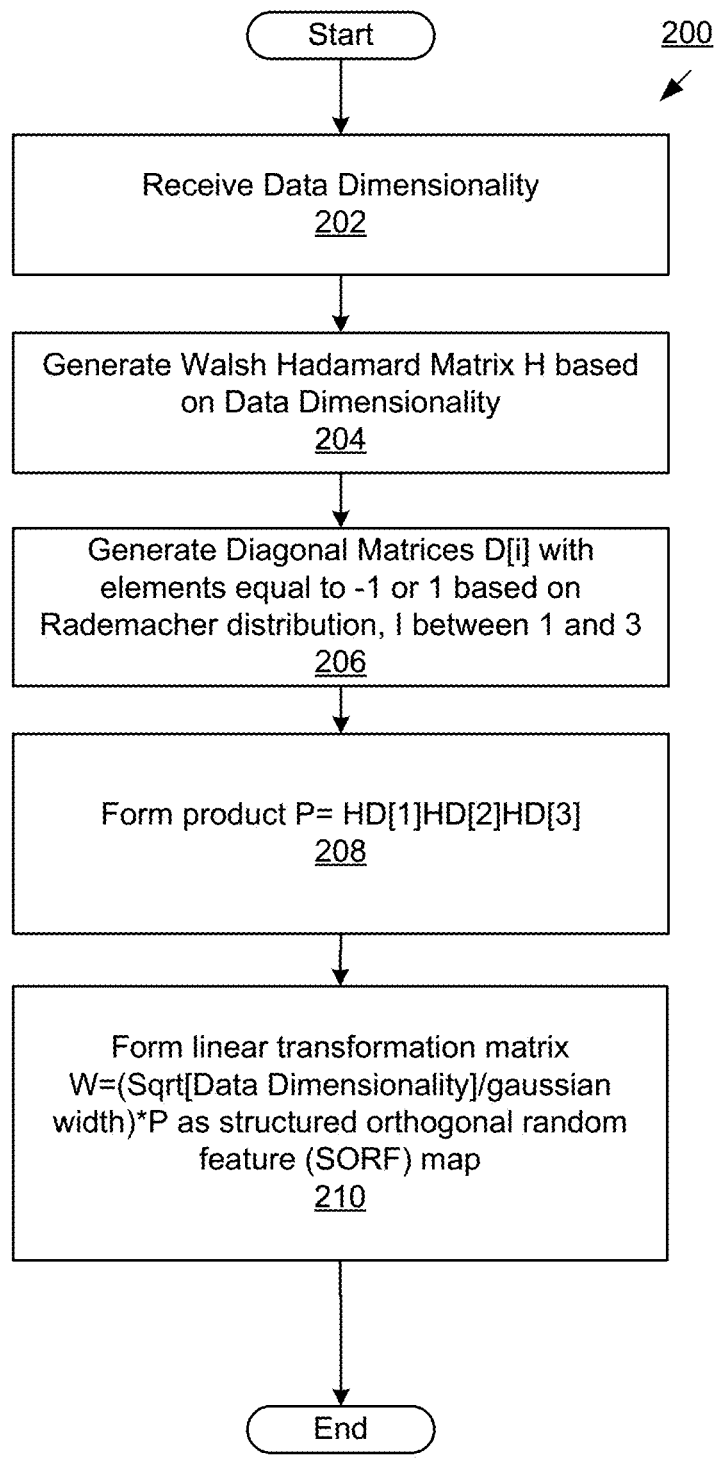
FIG. 2 illustrates a flow diagram of an example process for generating input for a kernel-based machine learning system that uses a kernel to perform classification operations on data.

FIG. 2 is a flow chart that illustrates an example method 200 of generating input for a kernel-based machine learning system that uses a kernel to perform classification operations on data shown in FIG. 1. The method 200 may be performed by software constructs described in connection with FIG. 1, which reside in memory 126 of the kernel-based machine learning server 120 and are run by the set of processing units 124.

At 202, the kernel-based machine learning server 120 receives a dimensionality of vector data d to be classified using a gaussian kernel.

At 204, the kernel-based machine learning server 120 generates a Walsh-Hadamard matrix $H_n$ having a dimension $2^n$ that is the smallest power of two greater than d, i.e., $n=\lceil \log_2 d \rceil$.

At 206, the kernel-based machine learning server 120 generates a set of diagonal matrices $D_1, D_2, \ldots, D_N$, each diagonal matrix having diagonal elements equal to either −1 or 1 and sampled at random according to a Rademacher distribution.

At 208, the kernel-based machine learning server 120 forms the matrix product $H_n D_1 H_n D_2 \cdots H_n D_N$.

At 210, the kernel-based machine learning server 120 multiplies the matrix product by the quantity $$\frac{\sqrt{d}}{\sigma}$$

to form the linear transformation matrix $W_{SORF}$.

Figure 3A:
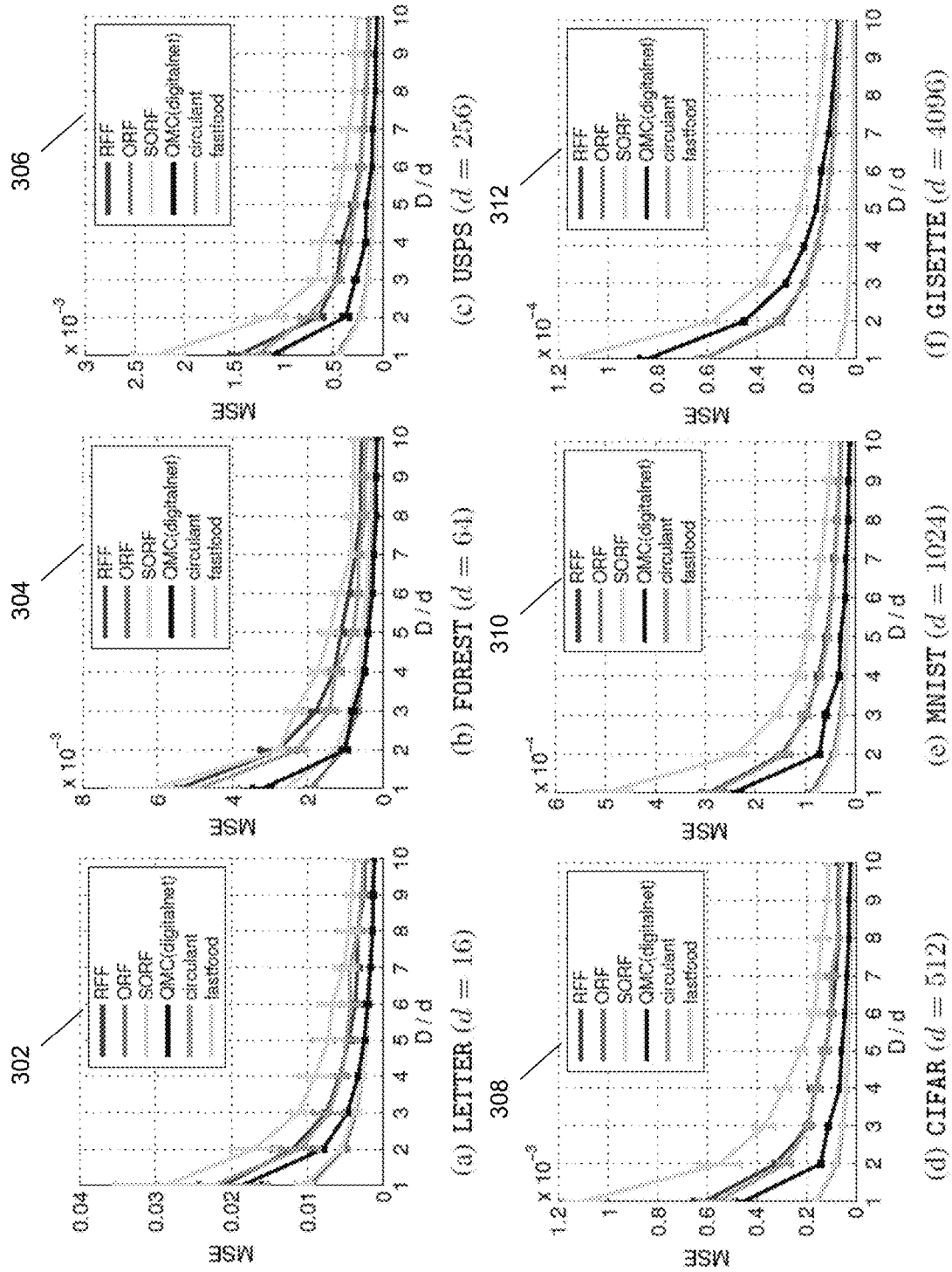
FIG. 3A illustrates example plots of means square error (MSE) of various approximations to gaussian kernels of varying dimension, which show benefits of the disclosed subject matter.

FIG. 3A shows results of the above-described Structured Orthogonal Random Features (SORF) approximation in terms of mean-square error (MSE) relative to an exact computation of a gaussian kernel and other approximations. The other approximations plotted in the results include:

Random Fourier Features (RFF) approximation described above:

$$W_{RFF} = \frac{1}{\sigma} G,$$

where G is a matrix having elements sampled according to a normal distribution that is the Fourier transform of the gaussian kernel;

Orthogonal Random Features (ORF) approximation, which is an approximation of the form $$W_{ORF} = \frac{1}{\sigma}SQ,$$

where Q is an orthogonal matrix derived from the randomly sampled gaussian matrix G by a Gram-Schmidt orthonormalization, and S is a diagonal matrix having elements randomly generated according to a chi distribution;

Quasi-Monte Carlo (QMC) approximation, which is similar to ORF except that the samples are chosen according to deterministic, low-displacement rank sequences;

Fastfood is a structured matrix approximation to the kernel of the form $$\frac{1}{\sigma\sqrt{d}}SHG\Pi HB,$$

where H is a Hadamard matrix, G is a random gaussian matrix with values distributed according to a normal distribution, Π is a permutation matrix, B is a random binary matrix, and S is a scaling matrix that ensures the rows of the linear transformation matrix have norms that follow a prescribed behavior;

Circulant is an approximation to the kernel based on a compact nonlinear map.

In the plots 302, 304, 306, 308, 310, and 312, the dimensionality d increases by a factor of two between plots. Each plot illustrates a behavior of MSE vs. feature vector length D for D>d. It is noted that the SORF approximation has significantly smaller MSE than any other of the above-described approximations, and the reduction in MSE for SORF relative to the other approximations is more apparent with increasing d.

Figure 3B:
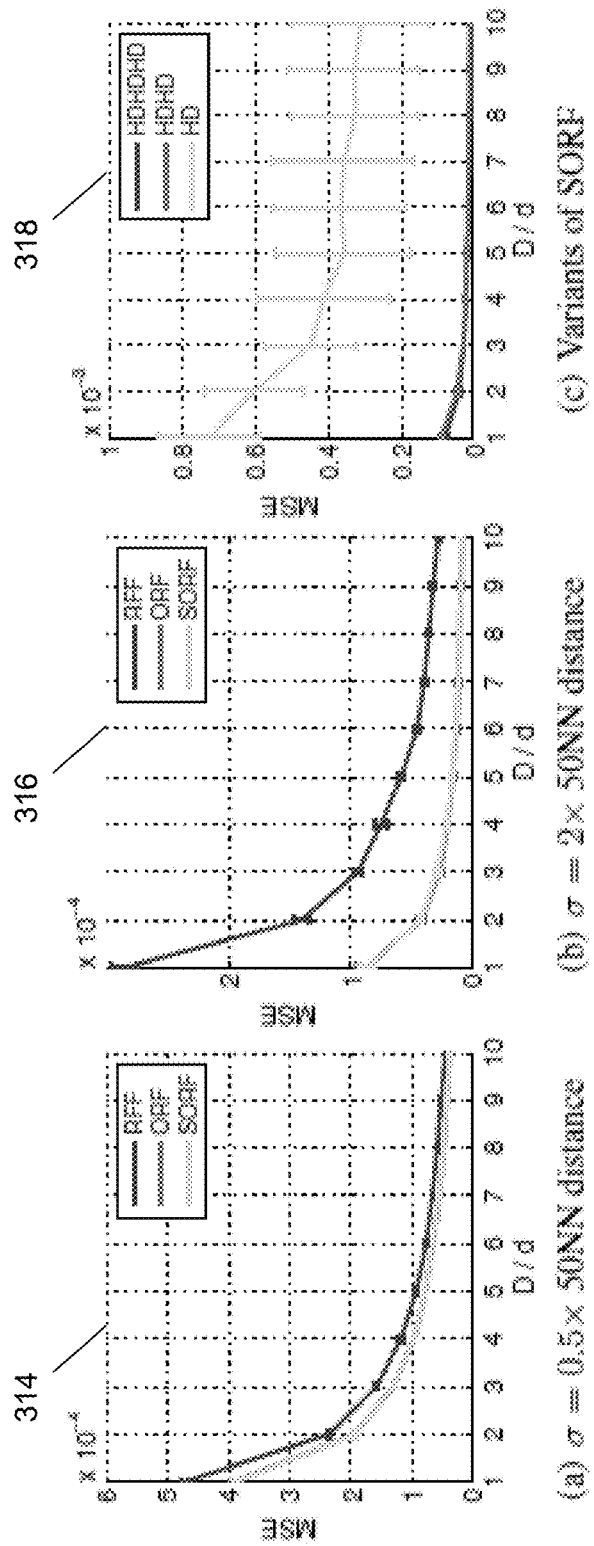
FIG. 3B illustrates additional example plots of means square error (MSE) of various approximations to gaussian kernels of varying dimension, which show additional benefits of the disclosed subject matter.

FIG. 3B shows additional plots of the MSE for various approximations. In plots 314 and 316, the MSE for SORF, ORF, and RFF are compared for two different gaussian widths at d=1024. In these cases, SORF and ORF have better MSE values for the larger value of the width relative to RFF. In plot 318, it is apparent that at least two pairs of products of Walsh-Hadamard matrices and diagonal matrices are needed for desirable MSE values.

FIG. 4 shows a table of classification accuracies 400 with a linear SVM classifier based on the SORF, ORF, and RFF kernel approximations for varying d and D. From this table, one may deduce that the SORF approximation is competitive or better than RFF, but with greatly reduced resource requirements in time and space/memory. Again, the linear transformation matrix $W_{SORF}$ has a computational cost in space that is O(D) and in time that is O(D log D).

Figure 5:
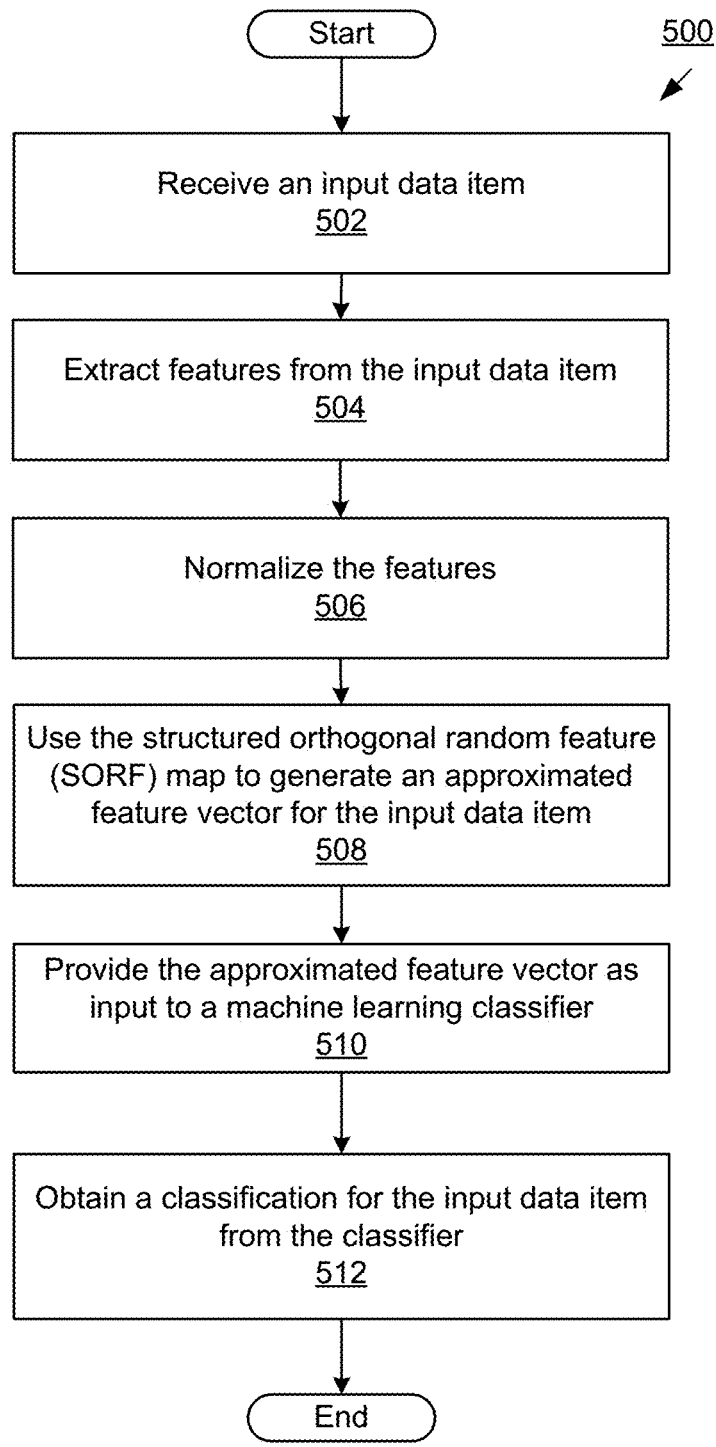
FIG. 5 is a flowchart of an example process for using structured orthogonal random features with a classification engine, in accordance with disclosed subject matter.

FIG. 5 is a flow chart of an example process 500 for using spherical random features with a classification engine, in accordance with disclosed subject matter. Process 500 may be performed by a large-scale learning system, such as system 100 of FIG. 1. Process 500 is an example of transforming an input vector to a second vector, which is a non-linear approximation of an input vector, using the kernel-based machine learning server 120 of FIG. 1. Process 500 may begin with the large-scale learning system receiving an input data item (502). The input data item may be any item from which a feature vector can be extracted. Examples include images, documents, video files, sound files, entities with metadata, user profiles, etc. The system may extract features from the input data item (504) using conventional techniques. The system may normalize the feature vector (506) to unit $\ell_2$ norm. The system may then use the structured orthogonal random feature (SORF) map (e.g., generated as part of process 200 of FIG. 2) to generate an approximated feature vector for the input data item (508). The approximated feature vector may be a non-linear approximation with a different dimensionality than the input feature vector.

The system may provide the approximated feature vector as input to a classifier (510). The classifier may have access to a large store of data items. The data items may already have corresponding approximated feature vectors or may initiate generation of approximated feature vectors for the data items. In some implementations, the classifier may calculate a dot product between the approximated feature vectors for the input data item and the store of data items. In some implementations, the classifier may use the dot product to determine a label, classification, etc. for the input data item. For example, the classifier may classify an image as an animal, person, building, etc. In some implementations, the classifier may determine items in the data store that are most similar to the input data item. Thus, the system may obtain a classification for the input data item from the classifier (512). Process 500 then ends.

The process of FIG. 5 is one example of using structures orthogonal random features. The feature map (e.g. output from the kernel-based machine learning server 120) can be used in any machine learning application, including but not limited to clustering, regression, anomaly analysis, etc. Thus, for example, an alternate step 512 may include obtaining a cluster assignment for the input data item, obtaining a regression analysis for the input data item. etc. Moreover, the spherical random features may be used as training examples for the machine learning classifier, e.g., in a training mode that takes place before process 500 is performed.

FIG. 6 shows an example of a generic computer device 600, which may be kernel-based machine learning server 120, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 632, desktop computer 634, or smart phone 636. An entire system may be made up of multiple computing devices 600 communicating with each other. Other configurations are possible.

FIG. 7 shows an example of a generic computer device 700, which may be kernel-based machine learning server 110 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 780a-780d. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758a-758n, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
   performing a classification operation on a first item, including:
      generating, by processing circuitry of a computer configured to operate a kernel-based machine learning classifier, a plurality of diagonal matrices, each of the plurality of diagonal matrices having non-diagonal elements that are zero and diagonal elements that have values distributed according to a specified probability distribution function and having a dimension based on a specified dimension;
      producing, by the processing circuitry, a plurality of orthogonal matrices, each of the plurality of orthogonal matrices having mutually orthogonal rows;
      for each of the plurality of diagonal matrices, forming, by the processing circuitry, a plurality of matrix pairs, each of the plurality of matrix pairs including (i) that diagonal matrix, and (ii) a respective orthogonal matrix of the plurality of orthogonal matrices;
      generating, by the processing circuitry, a product of each of the plurality of matrix pairs to produce a linear transformation matrix;
      obtaining, by the processing circuitry, an input vector representing the first item from a database, the input vector having the specified dimension;
      using the linear transformation matrix to produce an approximated feature vector for the input vector, the approximated feature vector including a nonlinear function of inner products of row vectors of the linear transformation matrix and the input vector; and
      providing the approximated feature vector as input into the kernel-based machine learning classifier; and
      determining, by the processing circuitry, whether the first item has a particular classification based on an output of the kernel-based machine learning classifier.

2. The method as in claim 1, wherein generating the product of each of the plurality of matrix pairs includes, for each of the plurality of diagonal matrices, right-multiplying the respective orthogonal matrix by that diagonal matrix.

3. The method as in claim 1, wherein producing the plurality of orthogonal matrices includes generating, as the respective orthogonal matrix, a Walsh-Hadamard matrix having a size based on the specified dimension of the input vector.

4. The method as in claim 3, wherein generating the Walsh-Hadamard matrix includes forming the Walsh-Hadamard matrix having the size equal to a least power of two that is larger than the specified dimension of the input vector, and
   wherein the method further comprises multiplying the linear transformation matrix by a vector that represents the input vector by (i) appending the input vector with zeroes to produce a zero-padded vector having a length equal to the least power of two larger than the specified dimension of the input vector, (ii) performing an inner product calculation on each row of the linear transformation matrix and the zero-padded vector to produce an intermediate feature vector, and (iii) removing elements from an end of the intermediate feature vector to produce the approximated feature vector.

5. The method as in claim 1, wherein each of the diagonal elements of each of the plurality of diagonal matrices is equal to one of 1 and −1.

6. The method as in claim 5, wherein the diagonal elements of each of the plurality of diagonal matrices are distributed according to a Rademacher distribution.

7. The method as in claim 1, wherein the plurality of diagonal matrices has at least two diagonal matrices.

8. A computer program product comprising a non-transitory storage medium, the computer program product including code that, when executed by processing circuitry, performs a method, the method comprising:
   performing a classification operation on a first item, including:
      generating a plurality of diagonal matrices, each of the plurality of diagonal matrices having non-diagonal elements that are zero and diagonal elements that have values distributed according to a specified probability distribution function and having a dimension based on a specified dimension;
      producing a plurality of orthogonal matrices, each of the plurality of orthogonal matrices having mutually orthogonal rows;
      for each of the plurality of diagonal matrices, forming a plurality of matrix pairs, each of the plurality of matrix pairs including (i) that diagonal matrix, and (ii) a respective orthogonal matrix of the plurality of orthogonal matrices;
      generating a product of each of the plurality of matrix pairs to produce a linear transformation matrix;
      obtaining an input vector representing the first item from a database, the input vector having the specified dimension;

using the linear transformation matrix to produce an approximated feature vector for the input vector, the approximated feature vector including a nonlinear function of inner products of row vectors of the linear transformation matrix and the input vector; and providing the approximated feature vector as input into a kernel-based machine learning classifier; and determining whether the first item has a particular classification based on an output of the kernel-based machine learning classifier.

9. The computer program product as in claim 8, wherein generating the product of each of the plurality of matrix pairs includes, for each of the plurality of diagonal matrices, right-multiplying the respective orthogonal matrix by that diagonal matrix.

10. The computer program product as in claim 8, wherein producing the plurality of orthogonal matrices includes generating, as the respective orthogonal matrix, a Walsh-Hadamard matrix having a size based on the specified dimension of the input vector.

11. The computer program product as in claim 10, wherein generating the Walsh-Hadamard matrix includes forming the Walsh-Hadamard matrix having the size equal to a least power of two that is larger than the specified dimension of the input vector, and wherein the method further comprises multiplying the linear transformation matrix by a vector that represents the input vector by (i) appending the input vector with zeroes to produce a zero-padded vector having a length equal to the least power of two larger than the specified dimension of the input vector, (ii) performing an inner product calculation on each row of the linear transformation matrix and the zero-padded vector to produce an intermediate feature vector, and (iii) removing elements from an end of the intermediate feature vector to produce the approximated feature vector.

12. The computer program product as in claim 8, wherein each of the diagonal elements of each of the plurality of diagonal matrices is equal to one of 1 and −1.

13. The computer program product as in claim 12, wherein the diagonal elements of each of the plurality of diagonal matrices are distributed according to a Rademacher distribution.

14. The computer program product as in claim 8, wherein the plurality of diagonal matrices has at least two diagonal matrices.

15. An electronic apparatus comprising:
memory; and
controlling circuitry coupled to the memory, the controlling circuitry being configured to:
perform a classification operation on a first item, including:
generate a plurality of diagonal matrices, each of the plurality of diagonal matrices having non-diagonal elements that are zero and diagonal elements that have values distributed according to a specified probability distribution function and having a dimension based on a specified dimension;
produce a plurality of orthogonal matrices, each of the plurality of orthogonal matrices having mutually orthogonal rows;
for each of the plurality of diagonal matrices, form a plurality of matrix pairs, each of the plurality of matrix pairs including (i) that diagonal matrix, and (ii) a respective orthogonal matrix of the plurality of orthogonal matrices;
generate a product of each of the plurality of matrix pairs to produce a linear transformation matrix;
obtain an input vector representing the first item from a database, the input vector having the specified dimension;
use the linear transformation matrix to produce an approximated feature vector for the input vector, the approximated feature vector including a nonlinear function of inner products of row vectors of the linear transformation matrix and the input vector; and
provide the approximated feature vector as input into a kernel-based machine learning classifier to perform a classification operation on the first item; and
determine whether the first item has a particular classification based on an output of the kernel-based machine learning classifier.

16. The electronic apparatus as in claim 15, wherein the controlling circuitry configured to generate the product of each of the plurality of matrix pairs is further configured to, for each of the plurality of diagonal matrices, right-multiply the respective orthogonal matrix by that diagonal matrix.

17. The electronic apparatus as in claim 15, wherein the controlling circuitry configured to produce the plurality of orthogonal matrices is further configured to generate, as the respective orthogonal matrix, a Walsh-Hadamard matrix having a size based on the specified dimension of the input vector.

18. The electronic apparatus as in claim 17, wherein the controlling circuitry configured to generate the Walsh-Hadamard matrix is further configured to form the Walsh-Hadamard matrix having the size equal to a least power of two that is larger than the specified dimension of the input vector, and wherein the controlling circuitry is further configured to multiply the linear transformation matrix by a vector that represents the input vector by (i) appending the input vector with zeroes to produce a zero-padded vector having a length equal to the least power of two larger than the specified dimension of the input vector, (ii) performing an inner product calculation on each row of the linear transformation matrix and the zero-padded vector to produce an intermediate feature vector, and (iii) removing elements from an end of the intermediate feature vector to produce the approximated feature vector.

19. The electronic apparatus as in claim 15, wherein each of the diagonal elements of each of the plurality of diagonal matrices is equal to one of 1 and −1.

20. The electronic apparatus as in claim 19, wherein the diagonal elements of each of the plurality of diagonal matrices are distributed according to a Rademacher distribution.

* * * * *